UNITED STATES PATENT OFFICE.

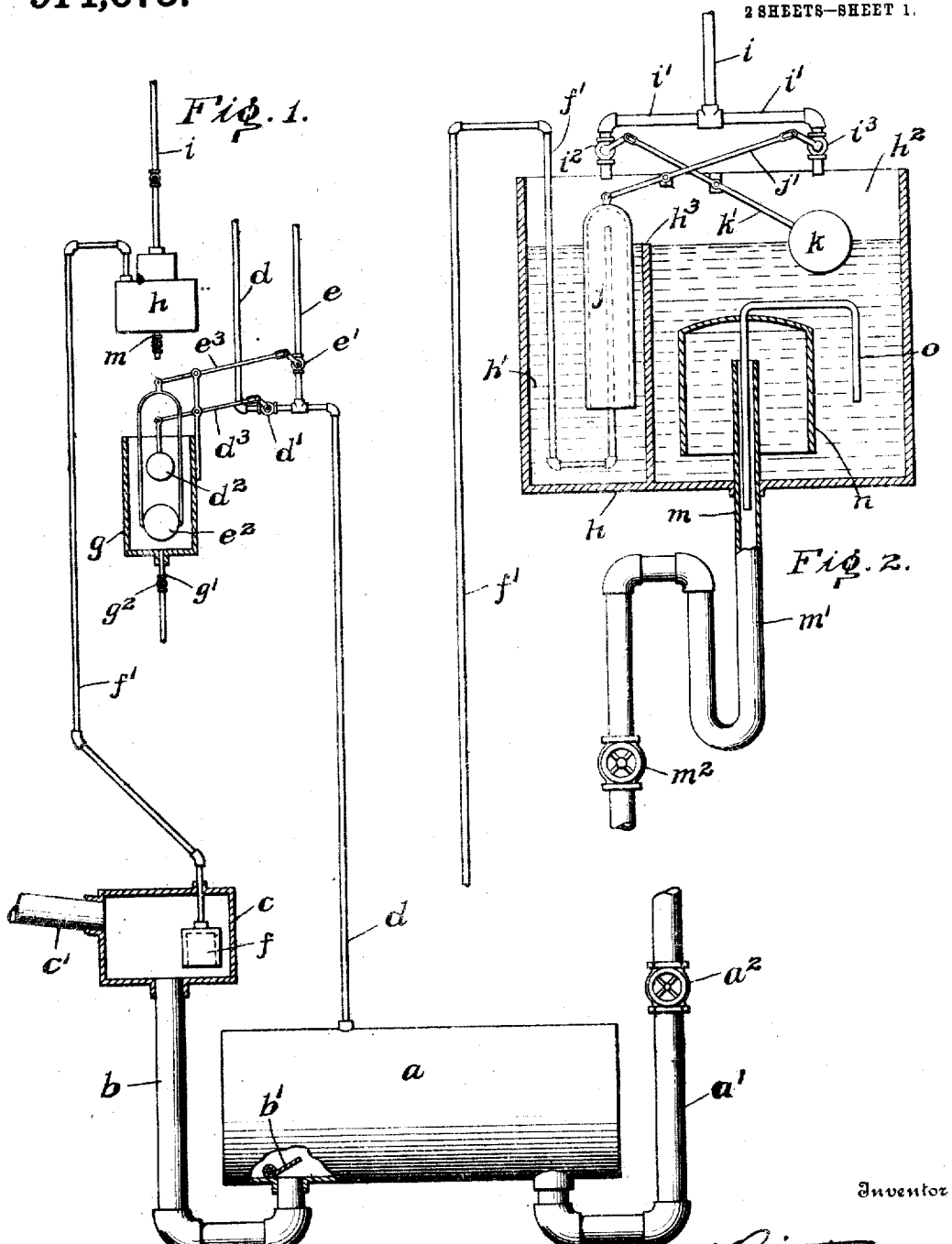

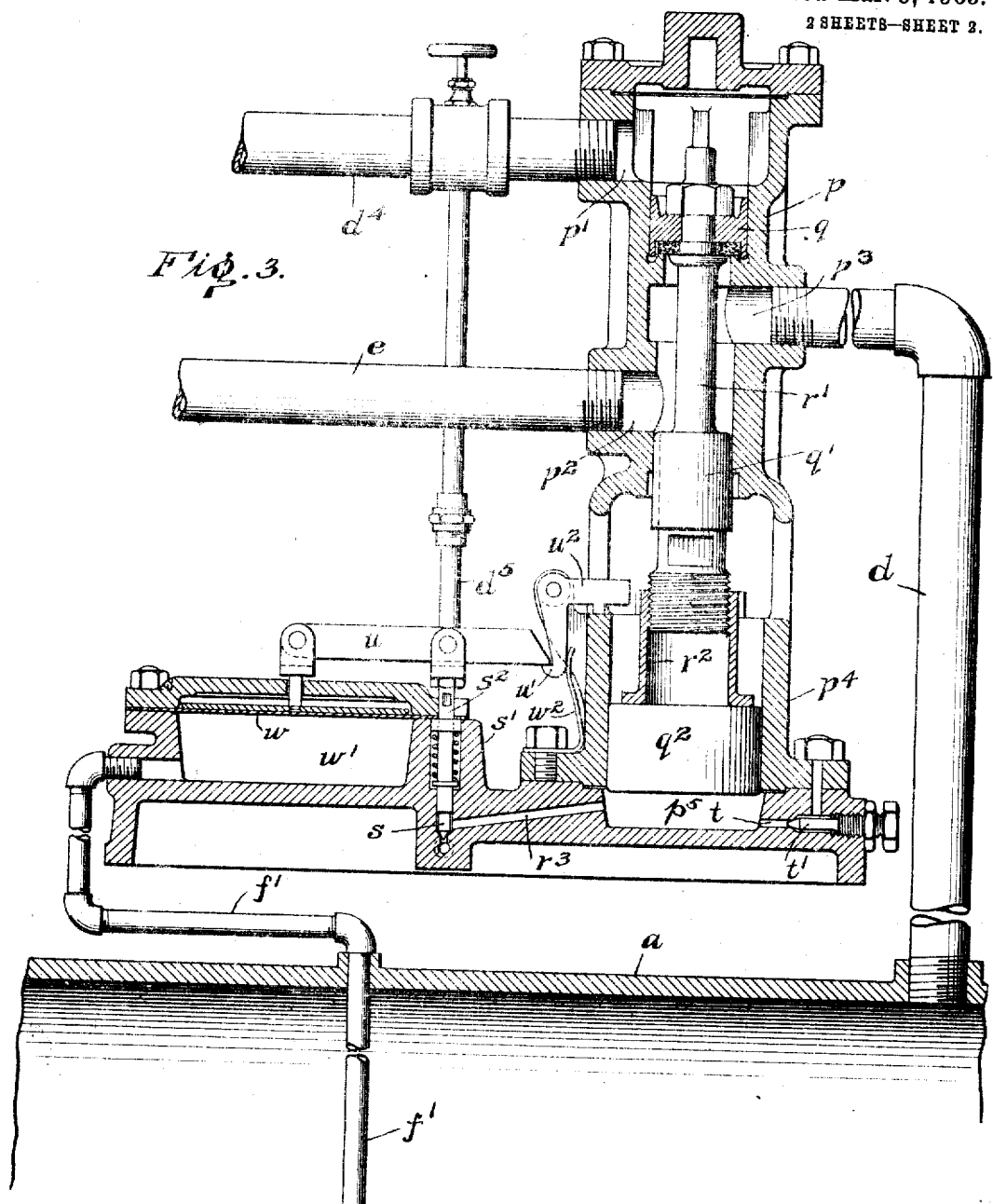

ALBERT PRIESTMAN, OF PHILADELPHIA, PENNSYLVANIA.

APPARATUS FOR CONTROLLING THE APPLICATION AND RELIEF OF PRESSURE TO TANKS AND OTHER APPLIANCES.

No. 914,673.

Specification of Letters Patent.

Patented March 9, 1909.

Application filed April 16, 1907. Serial No. 368,559.

*To all whom it may concern:*

Be it known that I, ALBERT PRIESTMAN, of the city and county of Philadelphia and State of Pennsylvania, have invented an Improvement in Apparatus for Controlling the Application and Relief of Pressure to Tanks and other Appliances, of which the following is a specification.

In many cases where fluid pressure is applied to a tank or other appliance for the purpose of forcing material or producing other results, it is necessary or desirable that such pressure should be applied and relieved at intervals, and that the moment of relief should be timed, and controlled independently of the means which control the admission of the pressure. This is particularly the case in sewage forcing apparatus, in which case sewage is forced from a tank or receptacle by air pressure admitted to the tank through a force pipe. The admission of the pressure is usually controlled automatically by the level of the contents of the tank, but it is necessary that the relief of the pressure should be controlled by means independent of the level of the contents, so that the pressure may be maintained to fully discharge the contents after the level has fallen to such an extent as would relieve the pressure, if it was not otherwise controlled. It is also desirable in many cases that the operation of the pressure relieving devices should be timed so that the relief may take place at a fixed interval after the pressure is applied, and that that interval may be varied and regulated to suit the requirements of the particular case.

I do not mean to limit my invention in its application to any particular use, but for purposes of explanation I have shown it applied to a sewage tank or receptacle for the purpose of discharging the sewage from the tank to a higher level; and in this case the admission of the pressure to the tank is controlled by pneumatic devices controlled by the level of the contents of the tank.

The invention may be applied for example to the admission of air blasts at intervals to a fog-horn, or to any case where the pressure is to be applied and relieved at intervals and the relief is controlled by means independent of those which control the admission. The invention, broadly considered, is not limited to any particular form of valves and devices for controlling the pressure pipe. The valves in the pressure pipe may be controlled either hydrostatically or pneumatically, and I have shown both forms in the drawings. These hydrostatic devices, however, constitute the preferred form in the present application and therefore are claimed specifically as a part of the present invention.

In the drawings: Figure 1 is a diagram illustrating one form of my invention applied to a sewage forcing apparatus, some of the parts being shown in section; Fig. 2 is a vertical section enlarged of the pneumatically controlled hydrostatic devices for controlling the hydrostatic valve operating devices shown in Fig. 1; and Fig. 3 is a vertical section of the pneumatic operating devices showing the same connected with the receptacle and with the pneumatic controlling devices which are controlled by the sewage.

$a$ is any appliance to which the pressure is to be applied at intervals; as shown it is a forcing tank or receptacle, which receives sewage, and from which the sewage is forced through the discharge pipe $a'$, which latter may be provided with a suitable valve $a^2$.

$b$ is the inlet pipe, through which the sewage flows into the tank; the inlet is provided with a check valve $b'$ to prevent back flow when pressure is applied to the cylinder or tank to force the sewage out through the pipe $a'$.

In the particular arrangement shown in Fig. 1, there is a receiver $c$ which receives the sewage from the main $c'$ and discharges it through the pipe $b$. In some cases this receiver is omitted and the discharge is directly to the tank $a$ through the check valve $b'$. $d$ is the fluid pressure pipe, which leads from a pressure main, or pressure accumulator, to the upper part of the receptacle $a$, and is provided with a suitable valve $d'$ and with a vent pipe $e$ also provided with a valve $e'$. Suitable means are employed for operating the valves $d'$ and $e'$ so that fluid pressure may be applied to the tank $a$ when the valve $d'$ is open and the valve $e'$ is closed, and that the pressure may be relieved when the valve $d'$ is closed and $e'$ is open; and to render the apparatus automatic for admitting pressure, these means for operating the valves $d'$ and $e'$ are controlled by the conditions existing in the tank $a$, i. e. the accumulation of sewage therein. $f$ is an inverted bell which may be in the receiver $c$, as in Fig. 1, or in the tank $a$, as in Fig. 3. This bell is so arranged that air will be compressed in it and forced through the air pipe $f'$, when the sewage accumulates in the tank $a$ to a sufficient level to be in condition for discharge.

In the arrangement shown in Fig. 1, after the tank $a$ has become filled the sewage will rise in the pipe $b$ and receiver $a$ and will force air through the bell $f$ and pipe $f'$ to the controlling devices of the valve operating mechanism of the pressure pipe.

I do not mean to limit my invention, considered broadly, to any particular form of valve operating mechanism or of controlling devices therefor. In Fig. 1, I have shown hydrostatic means both for operating the valves and for controlling the valve operating means. $d^2$ and $e^2$ are respectively floats connected by suitable levers $d^3$, $e^3$ with the valves $d'$ and $e'$ respectively, and $g$ is a tank in which the floats $d^2$ and $e^2$ are suspended; this tank is provided with a valved outlet $g'$. The floats $d^2$ and $e^2$ are suspended at different levels, so that, as the water rises in the tank $g$ it will operate first one float and its valve and then the other. In the arrangement shown the connections are such that when the floats $d^2$ and $e^2$ are lowered, i. e. when the tank is empty, the valve $e'$ will be open and the valve $d'$ will be closed; the tank $a$ is then vented and the sewage may flow into it by gravity. As the water rises in the tank $g$, it will first lift the float $e^2$ and close the valve $e'$ and on reaching a still higher level, it will lift the float $d^2$ and open the valve $d'$; pressure will then be admitted to the tank $a$ through the pressure pipe $d$ and the contents of the tank will be forced out through the pipe $a'$. This condition will continue until the level of the water falls in the tank $g$, when the valve $d'$ will be closed and the valve $e'$ opened. It is apparent therefore that the operation of the valve actuating floats $d^2$ $e^2$ will depend upon the supply of water in the tank $g$. This water is supplied from a tank $h$ and the flow is controlled by the air pressure in the pipe $f'$ leading from the air bell.

In Fig. 2, I have shown one form of devices for thus controlling the supply of water from the tank to the tank $g$. The tank $h$ is divided into two compartments $h'$ $h^2$ by a weir or partition $h^3$, and is supplied by branches $i'$ $i'$ from the main supply pipe $i$. These branches are controlled by valves $i^2$ $i^3$ respectively. The air pipe $f'$ enters the compartment $h'$ with a U bend and the open upturned end is inclosed in a bell $j$ connected by a suitable lever $j'$ with the valve $i^3$ in the branch $i'$ which supplies the compartment $h^2$. The valve $i^2$ in the branch to the compartment $h'$ is connected by a suitable lever $k'$ with a float $k$ in the compartment $h^2$. $m$ is the discharge pipe from the compartment $h^2$; it projects into said compartment and is inclosed by a bell $n$. The discharge end of the pipe $m$ is provided with a seal bend $m'$ and a suitable valve $m^2$. $o$ is a small vent pipe extending through the discharge pipe $m$ up through the top of bell $n$ and terminating in the compartment $h^2$ above the lower edge of the bell. The valve $i^2$ is open when the float $k$ is lowered and is closed by the rising of the float; the valve $i^3$ is normally closed and is opened by the rising of the bell $j$. Consequently when the compartment $h^2$ is empty or the water level in it is low the valve $i^2$ will be open and water will flow freely into the compartment $h'$, and filling it will flow over the top of the partition $h^3$ into the compartment $h^2$ and will partially fill it to the level at which the float $k$ will close the valve $i^2$. Further flow of water is thus stopped; the hydrostatic head of the column in the compartment $h^2$ is not, however, sufficient to break the seal in the discharge pipe $m$, and the column will be maintained in the compartment $h^2$. When, however, the rise of the sewage in the receiver $c$ forces air through the pipe $f'$ into the inverted bell $j$ the valve $i^3$ will be opened and water will again be admitted to the compartment $h^2$. The moment the water in that compartment attains sufficient height to force the seal, it will be discharged through the pipe $m$ into the tank $g$, and rising therein will first lift the float $e^2$ and close the vent valve $e'$, and then lift the float $d^2$ and open the valve $d'$. Pressure will then be admitted to the tank $a$ and the sewage will be forced out through the pipe $a'$. As the sewage is discharged the pressure in the bell $f$ and pipe $f'$ is relieved and the bell $j$ will fall and close the valve $i^3$. At the same time the discharge of the water from the compartment $h^2$ will lower the float $b$ and again open the valve $i^2$. The air pipe $o$ permits air to enter the discharge pipe $m$ when the inner end of said air pipe is unsealed for the purpose of again introducing air into the bell $n$. Meanwhile the water escapes from the tank $g$ through the discharge pipe $g'$ and as it recedes the floats $d^2$ and $e^2$ are successively lowered and the valve $d'$ is closed and the valve $e'$ opened. The flow from the tank $g$ may be controlled by the adjustment of the valve $g^2$ in the discharge pipe $g'$, so that the operation of the valves $d'$ $e'$ may be timed. Thus while the valves $d'e'$ are operated by means controlled by the conditions in the sewage tank to admit pressure to the tank for the purpose of forcing out the sewage, the operation of those valves for the purpose of relieving the pressure in the tank is controlled by means independent of the conditions in the tank, and therefore pressure may be maintained in the tank as long as may be desired irrespective of the fall in the level of the sewage and the consequent relief of the pneumatic pressure through the bell $f$ and pipe $f'$.

In Fig. 3 I have shown means for controlling the pressure pipe $d$ pneumatically instead of hydrostatically. $p$ is a valve cylinder having an inlet port $p'$ from the pressure main $d^4$, an outlet port $p^2$ to the vent $e$, and a port $p^3$ to the pressure pipe $d$. In the upper part of the cylinder is a piston valve $q$, which controls communication between the ports $p'$ and $p^3$, and below this, carried on the piston rod $r'$, is a valve $q'$, which controls the communication between the ports $p^3$ and $p^2$. $p^4$ is a cylinder below the cylinder $p$ in which is a piston $q^2$ connected by a suitable coupling $r^2$ with the piston rod $r'$. The piston $q^2$ is of larger diameter than the piston valve $q$. $d^5$ is a branch pipe from the pressure main $d^4$ which communicates with the cylinder $p^4$ below the piston $q^2$ by a suitable port or passageway $r^3$. This port or passageway $r^3$ is controlled by a valve $s$, normally closed by a spring $s'$. When the valve $s$ is opened air pressure from the branch $d^5$ will extend into the cylinder $p^4$. The same pressure per square inch will then be acting oppositely on the pistons $q$ and $q^2$, and by reason of the greater area of the latter the pistons will move forward and the vent port $p^2$ will be closed by the valve $q'$, while the valve $q$ will open communication between the ports $p'$ and $p^3$ and the air pressure will be admitted to the force pipe $d$. $t$ is a vent from the cylinder $p^4$, through which, when the valve $s$ is again closed, the compressed air may escape until the pressure on the piston $q^2$ is reduced sufficiently to enable the higher pressure now acting on the piston valve $q'$ to force the pistons back, closing communication between the ports $p'$ and $p^3$ and restoring communication between the port $p^3$ and the vent port to relieve the pressure in the force pipe $d$ and tank $a$. The vent $t$ may be regulated by a valve $t'$ to control the escape of the compressed air from below the piston $q^2$ and the time at which the valves $q$ and $q'$ will be operated. The operation of the valves $q\ q'$ is controlled by the valve $s$ and this in turn is controlled by the conditions, i. e. the accumulation of sewage, in the tank $a$, through the air bell $f$ and air pipe $f'$. As shown the stem $s^2$ is pivoted to a lever $u$, one end of which has its fulcrum at $u'$ and the other end of which is connected with a pressure motor $w$ controlled by the pressure from the air pipe $f'$. When air is forced from the bell $f$ through the pipe $f'$ into the motor chamber $w'$ it lifts the pressure motor $w$ and rocks the lever $u$ on its fulcrum $u'$ thus opening the valve $s$. It is desirable that the closing of the valve $s$ should be independent of the action of the pressure motor $w$, so that it may close again immediately after the piston $q^2$ has been operated, and for this purpose I employ the movable fulcrum $u'$. As shown this is a bell crank, of which one arm $u'$ acts as the fulcrum and the other $u^2$ projects in the path of the piston $q^2$ or of some part moving therewith, so that when the piston is moved to operate the valves it will strike the arm $u^2$ and rock the bell crank so as to remove the fulcrum $u'$ from under the lever $u$. As the lever $u$ is then unsupported at its outer end the spring $s'$ will pull it down and close the valve $s$. A spring $w^2$ acting on the bell crank $u'\ u^2$ maintains it in normal position and causes the fulcrum $u'$ to reëngage the lever $u$. The closing of the valve $s$ is thus independent of the operation of the motor $w$ and of the conditions in the tank $a$. While the valve $s$ remains open the pressure in the chamber $p^4$ prevents the return of the piston $q^2$ and the operation of the valves $q\ q'$, and as it is desirable that that operation should be independent of the conditions in the tank, it is desirable that the closing of the valve $s$ should also be independent of those conditions.

In each application of the invention illustrated, the means for controlling the valve devices to admit pressure through the pipe $d$ are controlled pneumatically through the bell $f$ and pipe $f'$ by the level of the contents of the tank $a$, or chamber $c$, but these means may be otherwise controlled, either automatically or not, according to the particular use to which the invention is applied. It will be noted that in any case the cutting off of the pressure, or the venting of the pipe $d$ and of the tank or appliance with which it is connected, is controlled by means independent of the means for admitting the pressure, and that those means may be so controlled that the time or interval that will elapse before such pressure is cut off or the pipe $d$ is vented may be regulated as may be desired.

In the form of the apparatus shown in Fig. 1 in which the hydrostatic controlling devices are employed, the relief is controlled by the level of the water in the tank $a$, and that may be regulated by the valve $q'$ to time the operation; in the form shown in Fig. 3, in which the pneumatic controlling devices are employed, the relief is controlled by the pressure in the chamber $p^5$ and that is regulated by the valve $t'$.

What I claim is as follows:

1. In apparatus for controlling and utilizing fluid pressure, the combination of an appliance to which the pressure is to be applied, a fluid pressure pipe leading to said appliance, means to control said pipe to admit pressure to said appliance, means external to said appliance independent of said means to admit fluid pressure to the appliance to relieve the same, and timing devices to control said means to relieve the pressure in said appliance to regulate the interval of time before the pressure will be relieved.

2. In apparatus for controlling and utilizing fluid pressure, the combination of an appliance to which the pressure is to be applied, a fluid pressure pipe leading to said appliance, valve devices to control said pipe, means external to said appliance to control said valve devices to admit pressure to said appliance, and means to automatically control said valve devices to relieve the pressure in said appliance, independent of the means to control said valve devices to admit pressure.

3. In apparatus for controlling and utilizing fluid pressure, the combination of an appliance to which pressure is to be applied, a fluid pressure pipe leading to said appliance, valve devices to control said pipe, and means independent of one another and external to the appliance to automatically control respectively the admission of pressure to the appliance through said pipe and the relief of said pressure.

4. In apparatus for controlling and utilizing fluid pressure, the combination of an appliance to which the fluid pressure is to be applied, a fluid pressure pipe leading to said appliance, means to control the admission of pressure to the appliance through said pipe, and means independent of said means to control the admission of pressure and external to said appliance to automatically control the relief of the pressure from the appliance through said pipe after a given interval.

5. In apparatus for controlling and utilizing fluid pressure, the combination of an appliance to which the fluid pressure is to be applied, a fluid pressure pipe leading to said appliance, means external to said appliance but controlled by the conditions in it to control the admission of pressure to the appliance through said pipe, and means independent of said means to control the admission of pressure to automatically control the relief of the pressure from the appliance through said pipe after a given interval.

6. In apparatus of the character described, the combination of an appliance to which pressure is to be applied, a pressure pipe leading to said appliance, valve devices external to the appliance to control the admission of pressure to the appliance through said pipe, hydrostatic devices to control said valve devices to admit pressure to the appliance through said pipe, and means to independently control said valve devices to relieve the pressure in the appliance through said pipe.

7. In apparatus of the character described, the combination of an appliance to which pressure is to be applied, a pressure pipe leading to said appliance, valve devices to control said pipe, hydrostatically operated devices to control said valve devices to apply pressure to said pipe, pneumatically controlled devices to control said hydrostatically operated devices, and means to independently control said valve devices to relieve the pressure in said pipe.

8. In apparatus of the character described, the combination of an appliance to which pressure is to be applied, a pressure pipe leading to said appliance, valve devices to control said pressure pipe to admit pressure to the appliance and to relieve the same, hydrostatically operated devices independent of the hydrostatic conditions in the appliance for controlling said valve devices, and means controlled by the conditions in said appliance to control said hydrostatically operated controlling devices.

9. In apparatus of the character described, the combination of an appliance to which pressure is to be applied, a pressure pipe leading to said appliance, valve devices to control said pressure pipe to admit pressure to the appliance and to relieve the same, hydrostatically operated devices for controlling said valve devices, and pneumatically controlled devices controlled by the conditions in the appliance for controlling said hydrostatically operated controlling devices.

10. In apparatus of the character described, the combination of an appliance to which pressure is to be applied, a pressure pipe leading to said appliance, valve devices to control said pressure pipe to admit pressure to the appliance, hydrostatically operated devices for operating said valve devices, and pneumatically controlled hydrostatically operated devices for controlling the hydrostatically operated devices for operating said valve devices.

11. In apparatus of the character described, the combination of an appliance to which pressure is to be applied, a pressure pipe leading to said appliance, valve devices to control said pressure pipe to admit pressure to the appliance and to relieve the same, means controlled by the conditions in the appliance but external thereto for operating said valve devices to admit pressure to said pipe, and means independent of said means controlled by the conditions in the appliance and also external to the appliance for operating said valve devices to relieve the pressure in the appliance.

12. In apparatus of the character described, the combination of an appliance to which pressure is to be applied, a pressure pipe leading to said appliance, valve devices to control said pressure pipe to admit pressure to the appliance and to relieve the same, means controlled by the conditions in the appliance but external thereto for operating said valve devices to admit pressure to the pipe, means independent of said means controlled by the conditions in the appliance and also external to the appliance for operating said valve devices to relieve the pressure in the pipe, and means to control the time of operation of said independent means for operating the valve devices.

13. In apparatus of the character described, the combination of an appliance to which pressure is to be applied, a pressure pipe leading to said appliance, valve devices to control said pressure pipe to admit pressure to the appliance and to relieve the same, a tank, hydrostatically controlled devices in said tank for operating said valve devices, means to supply water to said tank, and means to control the discharge of water from said tank.

14. In apparatus of the character described, the combination of an appliance to which pressure is to be applied, a pressure pipe leading to said appliance, valve devices to control said pressure pipe to admit pressure to the appliance and to relieve the same, a tank, hydrostatically controlled devices in said tank for operating said valve devices, a second tank arranged to supply water to the first tank, pneumatic devices controlled by the conditions in the appliance to control the discharge of water from the second tank to the first, and means to control the discharge from the first tank.

15. In apparatus for controlling and utilizing fluid pressure, the combination of an appliance to which the pressure is to be applied, a fluid pressure pipe leading to said appliance, means external to said appliance to control said pipe to admit pressure to said appliance, means additional to said means to admit fluid pressure and also external to said appliance independent of the condition therein to relieve the pressure in said appliance, and timing devices to control said means to relieve the pressure in said appliance and to regulate the interval of time before which the pressure will be relieved.

16. In apparatus for controlling and utilizing fluid pressure, the combination of an appliance to which the pressure is to be applied, a fluid pressure pipe leading to said appliance, valve devices to control said pipe, means external to said appliance to control said valve devices to admit pressure to said appliance, and means additional to said means to control said valve devices to admit pressure and also external to said appliance but independent of the condition therein to automatically control said valve devices to relieve the pressure in said appliance.

17. In apparatus for controlling and utilizing fluid pressure, the combination of an appliance to which the fluid pressure is to be applied, a fluid pressure pipe leading to said appliance, means to control the admission of pressure to the appliance through said pipe, and means additional to said means to control the admission of pressure and external to said appliance but independent of the conditions therein to automatically control the relief of the pressure from the appliance through said pipe after a given interval.

18. In apparatus for controlling and utilizing fluid pressure, the combination of an appliance to which the fluid pressure is to be applied, a fluid pressure pipe leading to said appliance, means external to said appliance but controlled by the conditions in it to control the admission of pressure to the appliance through said pipe, and means additional to said means to control the admission of pressure and independent of the conditions in the appliance to automatically control the relief of the pressure from the appliance through said pipe after a given interval.

19. In apparatus of the character described, the combination of an appliance to which pressure is to be applied, a pressure pipe leading to said appliance, valve devices to control said pressure pipe to admit pressure to the appliance and to relieve the same, means controlled by the conditions in the appliance but external thereto for operating said valve devices to admit pressure to said pipe, and means additional to said means controlled by the conditions in the appliance and also external to the appliance but independent of the conditions therein for operating said valve device to relieve the pressure in the appliance.

20. In apparatus of the character described, the combination of an appliance to which pressure is to be applied, a pressure pipe leading to said appliance, valve devices to control said pressure pipe to admit pressure to the appliance and to relieve the same, means controlled by the conditions in the appliance but external thereto for operating said valve devices to admit pressure to said pipe, means additional to said means controlled by the conditions in the appliance and also external to the appliance but independent of the conditions therein for operating said valve device to relieve the pressure in the appliance, and means to control the time of operation of said means for operating the valve devices to relieve the pressure in the appliance.

In testimony of which invention, I have hereunto set my hand.

ALBERT PRIESTMAN.

Witnesses:
R. M. KELLY.
M. F. DRISCOLL.